R. M. SIMPSON.
APPARATUS FOR SEPARATING METALS AND THE LIKE FROM EXTRANEOUS MATTER.
APPLICATION FILED AUG. 5, 1908.
957,478.
Patented May 10, 1910.
2 SHEETS—SHEET 1.
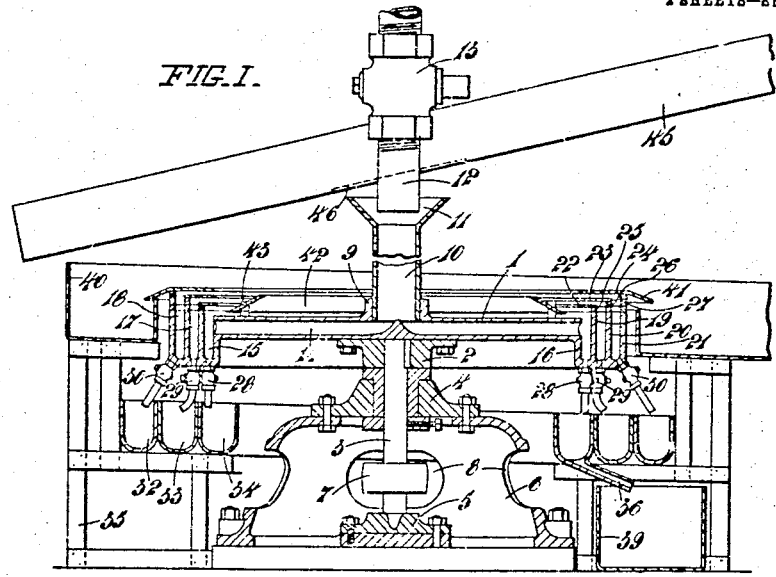
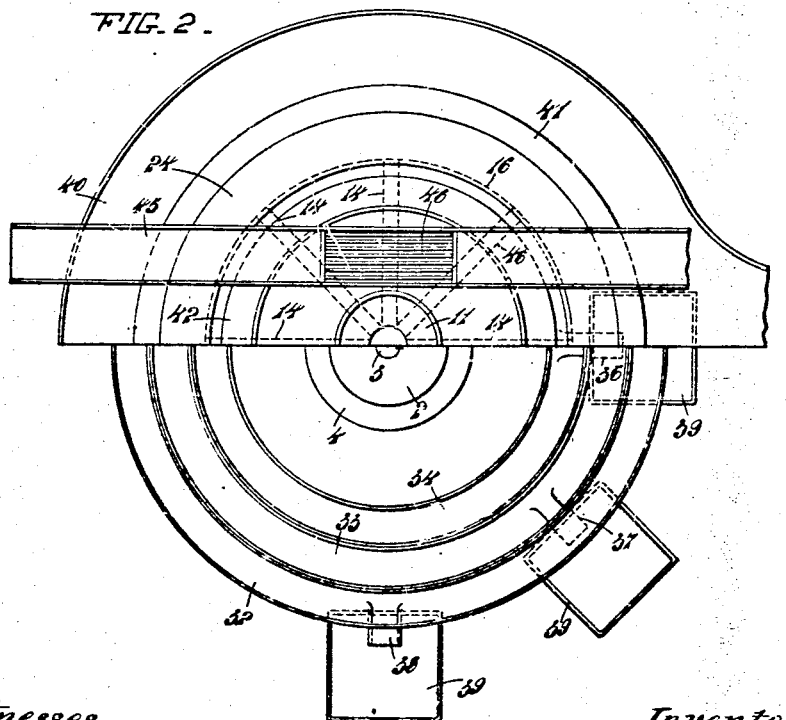
Witnesses.
Inventor.
Richard Middleton Simpson.
By Baldwin & Hayward
Attorneys.

R. M. SIMPSON.
APPARATUS FOR SEPARATING METALS AND THE LIKE FROM EXTRANEOUS MATTER.
APPLICATION FILED AUG. 5, 1908.
957,478. Patented May 10, 1910.
2 SHEETS—SHEET 2.
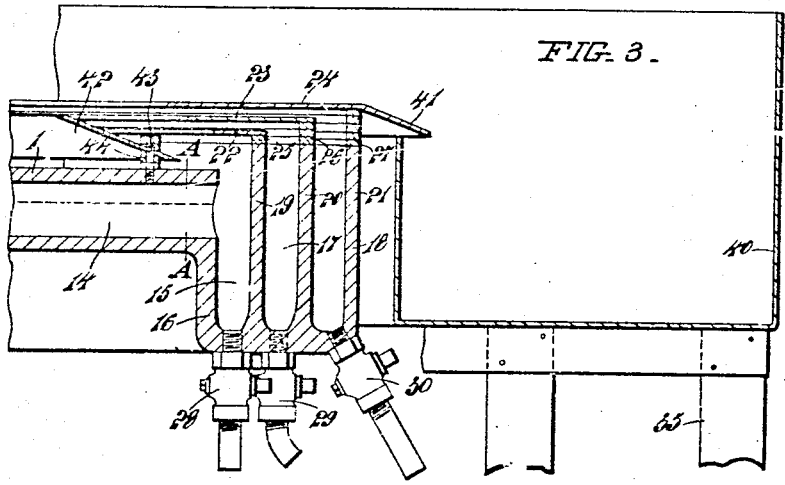
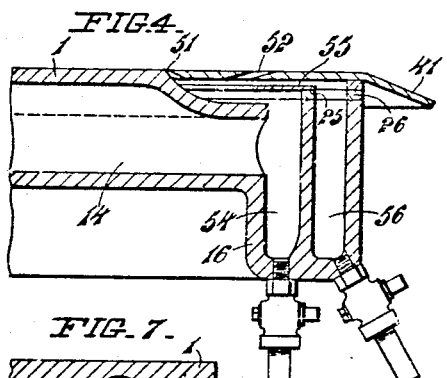
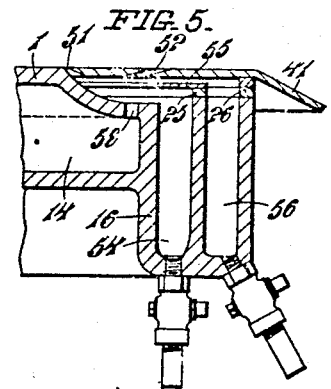
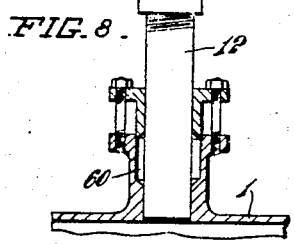
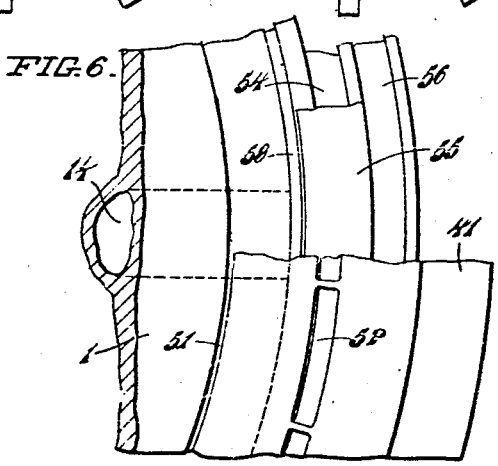
Witnesses.
Inventor.
Richard Middleton Simpson.
By Baldwin & Rayward
Attorneys.

UNITED STATES PATENT OFFICE.

RICHARD MIDDLETON SIMPSON, OF WELLINGTON, NEW ZEALAND.

APPARATUS FOR SEPARATING METALS AND THE LIKE FROM EXTRANEOUS MATTER.

957,478. Specification of Letters Patent. Patented May 10, 1910.

Application filed August 5, 1908. Serial No. 447,177.

*To all whom it may concern:*

Be it known that I, RICHARD MIDDLETON SIMPSON, a subject of His Majesty the King of Great Britain and Ireland, residing at 256 Lambton Quay, Wellington, in the Provincial District of Wellington, in the Dominion of New Zealand, have invented certain new and useful Improvements in Apparatus for Separating Metals and the Like from Extraneous Matter, of which the following is a specification.

This invention relates to apparatus used for obtaining metals and the like free from foreign matters, the object being to provide a machine which will separate metals and the like or other materials by mechanical means more effectively than has been possible with the apparatus at present in use.

By my invention centrifugal action is imparted to the material to be treated, and its progress under this action is impeded by an opposing current of water, the combined actions resulting in the separation of light from heavier material.

This specification will be confined to describe the invention as applied to separating gold from black sand, crushed quartz and the like.

I attain the object of my invention by the mechanism illustrated in the accompanying drawing in which:—

Figure 1, is a central sectional elevation of the entire machine, Fig. 2, is a plan of the machine, Fig. 3, a vertical section of part of the machine on a larger scale, Fig. 4, a vertical section showing a modification, Fig. 5, a vertical section, Fig. 6, a plan showing a further modification, Fig. 7, is a sectional elevation on line A—A Fig. 3, and Fig. 8, is an elevation of a stuffing box upon a pipe.

Referring more particularly to Figs. 1, 2, and 3, the circular table 1 is bolted to a boss 2, which is keyed to a vertical shaft 3 mounted in bearings 4 and 5 bolted to a pedestal 6. A pulley 7 adapted to receive a belt not shown in the drawing is fixed to the shaft 3, and holes 8 are provided in the pedestal 6 through which the belt may pass to any convenient source of power. A boss 9 projecting from the table receives the end of a vertical pipe 10 having a flared mouth 11. This pipe 10 is capable of receiving water from another pipe 12 fitted with a stop cock 13, and the length of the pipe 10 is determined by the pressure of water desired to be obtained at the bottom thereof. Radial channels 14 diverging from the boss 9 extend to the rim of the table and deliver into the first compartment 15 of a trough 16. The drawing shows other compartments 17 and 18, but this number may be decreased or increased to suit the material to be treated. The partitions 19 and 20, and the outer wall 21 of the trough are provided with covers 22, 23 and 24 respectively consisting of annular plates having their inner edges chamfered and projecting by gradations over the rim of the table, as shown in Fig. 1, or having the said edges vertical as shown in Fig. 3, to suit the material to be treated. Washers 25, 26 and 27 of different depths are interposed between the partitions and their covers, and by removing or introducing a washer or washers, the height of the covers relatively to the table 1 and to each other may be adjusted to suit the material to be treated. Cocks 28, 29 and 30 are fitted into the bottoms of the compartments 15, 17 and 18 and deliver into circular tanks 32, 33 and 34 carried upon a staging 35 and sloping toward their faucets 36, 37 and 38. A vat 39 located below the said faucets receives the contents of the tanks 32, 33 and 34. An annular receiver 40 surrounds the table and is adapted to catch material passing over the sloping rim 41 of the cover 24. A conical deflector plate 42 is fixed to the table 1, and is adjustable relative thereto by means of bolts 43 and washers 44. When coarse material is to be treated, a chute 45 is used having a perforated bottom 46 through which finer material passes to the table 1, coarse material passing down the chute clear of the machine.

The machine operates as follows:—Power is applied to the pulley 7 to rotate the table 1 and water is admitted to the pipe 10. When the material to be treated is finely divided, it is thrown directly upon the table, and when coarse material is to be treated, it is passed into the chute 45 with a stream of water, and the finer material is washed through the perforations in the bottom of the chute and falls upon the table. The centrifugal action imparted by the rotating table causes the material to travel toward the rim of the table, before reaching which, however, it is intercepted by the deflector plate 42 and evenly distributed. The current of water through the channels 14 and the compartment 15 meets the material after the said material has found its way below the deflector plate. The centrifugal action continuing, heavy particles pass over the rim of the table into the trough and lighter particles pass successively according to their specific gravities over the covers 22 and 23 into the trough, and rejected matter over the cover 24 into the receiver 40. The flow of water through the pipe 10, and consequently through the channels 14, and the heights of the covers 22, 23 and 24 relatively to the table 1 and to each other, and the height of the deflector plate relatively to the table are all adjustable, and the speed of rotation of the table is adjustable by any ordinary means such as cone pulleys, so that all necessary variations are available to adapt the machine to treat different kinds of materials. The cocks 28, 29 and 30 may be left open to allow the material after separation to pass into the tanks 32, 33 and 34 and thence into vats below the faucets 36, 37 and 38.

In the modification shown in Fig. 4 the table has a narrow annular slot 51, and nearer the rim a second and wider annular slot 52. The mouth of the slot 51 is its narrowest part, so that particles can get clear away without choking the slot. The slot 52 has a considerable slope so that the material driven by centrifugal action over the surface of the table will not have a tendency to fall through the slot when a flow of water is maintained upwardly through the slot. The operation in this case is similar to the operation previously described, heavy particles falling into the compartment 54, lighter particles being washed over the cover 55 into the compartment 56, and the rejected matter being washed through the slot 52 and thence into the receiver 40.

In the modification shown in Figs. 5 and 6, channels 14 are stopped at their ends and an annular slot 58 is made in the table into which the channels deliver their water.

Fig. 8 shows means employed when water under high pressure is brought to the pipe 10. The upwardly extending boss on table 1 is enlarged to form a stuffing box 60, and the pipe 12 enters the stuffing box. Thus the table is free to rotate, while a watertight joint is made with the pipe 12, which is connected to a water main.

What I do claim and desire to secure by Letters Patent of the United States is:

1. In an apparatus of the character described, the combination of a substantially horizontally arranged, circular, rotating table adapted to receive on its upper surface the material to be treated and having below said surface channels which radiate from its center to its periphery, means for supplying water to the inner ends of said channels, and a trough extending about the periphery of the table and having its interior divided into a plurality of concentric compartments, the walls of the inner compartment acting to cause the water issuing from said channels to pass upwardly onto the upper surface of the table and toward the center thereof.

2. In an apparatus of the character described, the combination of a substantially horizontally arranged, circular, rotating table adapted to receive on its upper surface the material to be treated and having below said surface channels which radiate from its center to its periphery, means for supplying water to the inner ends of said channels, and a trough surrounding the table and rotating therewith, said trough being divided into a plurality of concentric compartments the outer walls of which extend above the upper surface of the table, and separable covers supported by said outer walls of the compartments in the trough and projecting over the table.

3. In an apparatus of the character described, the combination of a substantially horizontally arranged, circular, rotating table adapted to receive on its upper surface the material to be treated and having below said surface channels which radiate from its center to its periphery, means for supplying water to the inner ends of said channels, and a trough surrounding the table and rotating therewith, said trough being divided into a plurality of concentric compartments the outer walls of which extend above the upper surface of the table, and separable covers supported by said outer walls of the compartments in the trough and projecting over the table, the height of the several walls of the trough and the extent of projection of the covers over the table gradually increasing as the distance of said walls from the table increases.

4. In an apparatus of the character described, the combination of a circular table mounted to rotate about a vertical axis, and having formed therein, below its upper surface a series of channels that open through its periphery, a conduit communicating with the inner ends of said channels and extending above the table, means for supplying material to be treated to the upper surface of the table, and a trough surrounding the table and divided into a plurality of compartments, the walls of the inner compartment being adapted to direct the water issuing from said channels over the upper surface of the table toward the center thereof.

5. Apparatus for separating material, comprising a circular rotating table provided with channels radiating from the center to the rim of the table, means for directing water flowing from the channels to the surface of the table, means for feeding material to be separated to the table, and means for spreading the material before reaching the rim of the table, substantially as set forth.

6. Apparatus for separating materials, comprising a circular rotating table provided with channels radiating from the center to the rim of the table, means for directing water flowing from the channels to the surface of the table, means for feeding material to be separated to the table, and a conical deflector plate fixed to the table, and acting to spread the material thereon in the path of the streams of water from said channels, substantially as set forth.

7. Apparatus for separating materials, comprising a circular rotating table provided with channels radiating from the center to the rim of the table, means for directing water flowing from the channels to the surface of the table, a conical deflector plate fixed to the table, means for feeding material to the table within the deflector to be spread thereby in the path of water issuing from said channels, and means for adjusting the deflector plate relatively to the table, substantially as set forth.

8. Apparatus for separating materials, comprising a circular rotating table provided with channels radiating from the center to the rim of the table, means for feeding material to be separated to the table, means for directing water flowing from the channels to the surface of the table, a conical deflector plate fixed to the table, and washers between the said deflector plate and the table, substantially as set forth.

9. Apparatus for separating materials, comprising a circular rotating table provided with channels radiating from the center to the rim of the table, means for feeding material to be separated to the table, a trough around the rim of the table into which water from the channels flows and is directed to the surface of the table, stop cocks in the bottom of the trough, annular tanks having faucets and into which the said cocks deliver, the said tanks being fixed in a position sloping toward the said faucets, substantially as set forth.

10. Apparatus for separating materials, comprising a circular rotating table provided with channels radiating from the center to the rim of the table and stopped at their outer ends, there being an annular slot near the rim of the table with which the channels communicate, a cover having an annular slot and extending over the rim of the table, there being an annular slot between the table and the cover, and means for feeding material to be separated to the table, substantially as set forth.

In testimony whereof I have signed my name to this specification in the presence of two witnesses.

RICHARD MIDDLETON SIMPSON.

Witnesses:
ERNEST SMITH BALDWIN,
HENRIE HAMPTON RAYWARD.